(12) United States Patent
Yang et al.

(10) Patent No.: US 7,057,440 B2
(45) Date of Patent: *Jun. 6, 2006

(54) MULTIPLIER-DIVIDER CIRCUIT FOR A PFC CONTROLLER

(75) Inventors: Ta-yung Yang, Milpitas, CA (US); Song-Yi Lin, Taipei (TW); Cheng-Chi Hsueh, Jhong-He (TW)

(73) Assignee: System General Corp., Taipei Hsien (TW)

( * ) Notice: Subject to any disclaimer, the term of this patent is extended or adjusted under 35 U.S.C. 154(b) by 185 days.

This patent is subject to a terminal disclaimer.

(21) Appl. No.: 10/700,787

(22) Filed: Nov. 3, 2003

(65) Prior Publication Data

US 2005/0093528 A1    May 5, 2005

(51) Int. Cl.
*G06G 7/12* (2006.01)
(52) U.S. Cl. .................. 327/355; 327/356; 327/360; 363/89
(58) Field of Classification Search ............... 363/80, 363/81, 89, 79, 84, 126; 323/222, 211, 284, 323/266, 224, 243; 327/355–360, 131–134, 327/90–94

See application file for complete search history.

(56) References Cited

U.S. PATENT DOCUMENTS 5,619,405 A * 4/1997 Kammiller et al. ........... 363/80
5,644,214 A * 7/1997 Lee ............................ 323/211

\* cited by examiner

*Primary Examiner*—Rajnikant B. Patel
(74) *Attorney, Agent, or Firm*—J.C. Patents (57) ABSTRACT

The present invention introduces an integrated analog multiplier-divider circuit. The multiplier-divider block according to the present invention is ideal for use in the power factor correction (PFC) controllers of many switch-mode power supplies. The analog multiplier-divider according to the present invention is built with CMOS devices. Because of this, it has many advantages over prior-art multiplier-dividers. One important advantage is that the die-size and the cost can be reduced. Another important advantage of the multiplier-divider according to the present invention is substantially reduced temperature dependence.

24 Claims, 9 Drawing Sheets

MULTIPLIER-DIVIDER CIRCUIT FOR A PFC CONTROLLER

BACKGROUND OF THE INVENTION

1. Field of the Invention

The present invention relates to the art of power supplies, and in particular to an analog multiplier-divider for a power factor correction (PFC) circuit.

2. Description of the Prior Art

There are many uses for analog multiplier-dividers in modern electronics. Multiplier-dividers produce an output signal that is proportional to a ratio of two or more input signals. The input and output signals can either be voltages or currents.

Figure 1:
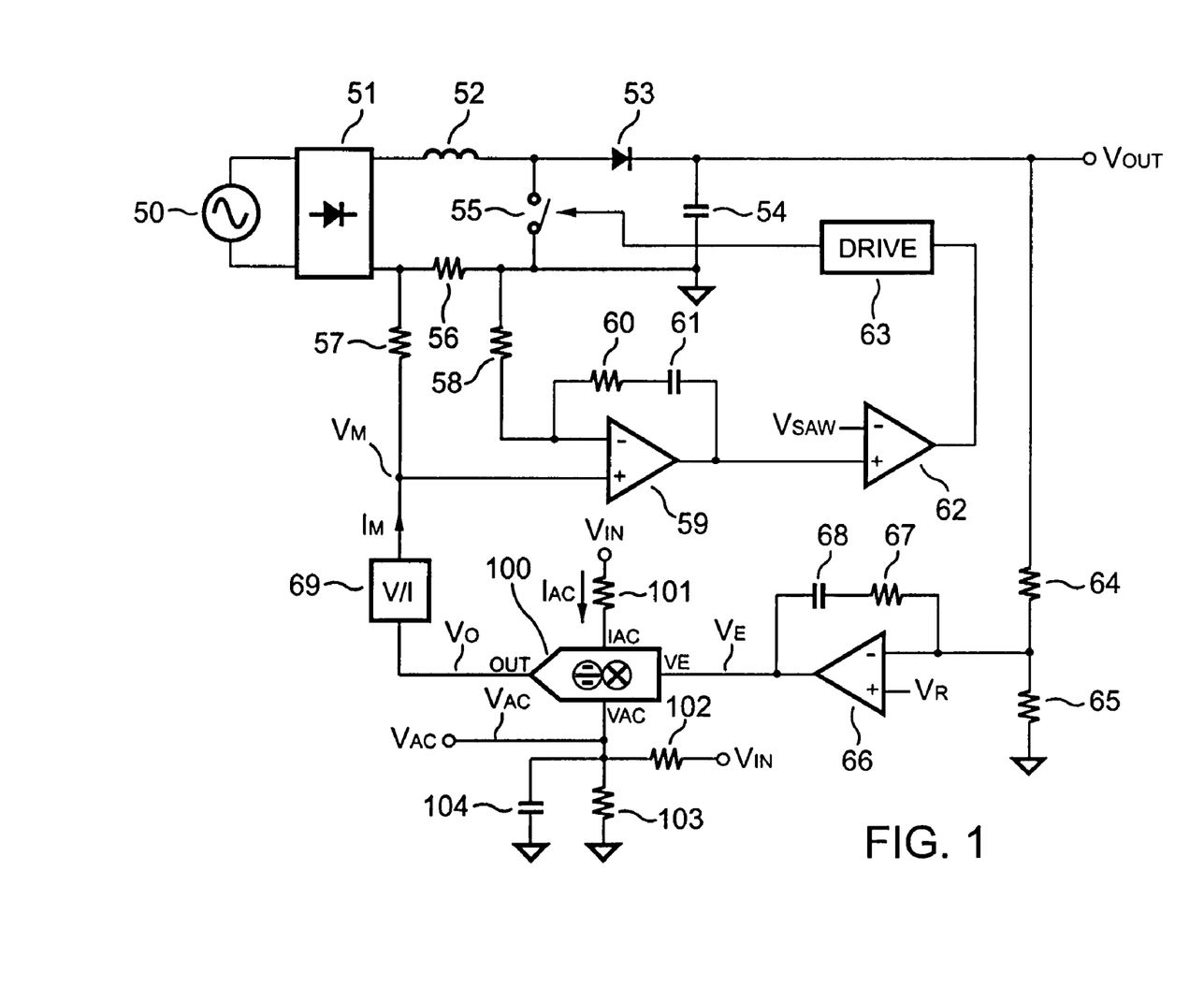
FIG. 1 shows a schematic diagram of a switch mode power supply with a power factor correction circuit including a multiplier-divider.

One common use of multiplier-dividers is in power factor correction (PFC) circuits. PFC circuits commonly use multiplier-dividers to generate a control signal based on the input current, the feedback signal, and the input voltage. FIG. 1 demonstrates the use of an analog multiplier-divider in a PFC circuit.

There are many known ways of constructing analog multiplier-dividers, such as logarithmic amplifiers and anti-log amplifiers. The implementation of a logarithmic amplifier normally uses the p-n junction volt-ampere characteristic; it is given by $$I_D = I_0 \times [\exp(V_D/\eta V_T) - 1] \quad (1)$$

where $I_0$ is the reverse saturation current; $V_D$ is the forward bias voltage; $\eta$ is the constant; $V_T = T/11,600$ and T is the temperature ° K. Since the output current $I_D$ is the exponential function of the forward bias voltage $V_D$, the linear operating region is small. The book "Analog Integrated Circuit Design" by David A. Johns and Ken Martin (1997, pg. 366–367) teaches a known analog multiplier-divider. This particular multiplier-divider is also referred to as a four-quadrant multiplier. It is shown in FIG. 2.

Figure 2:
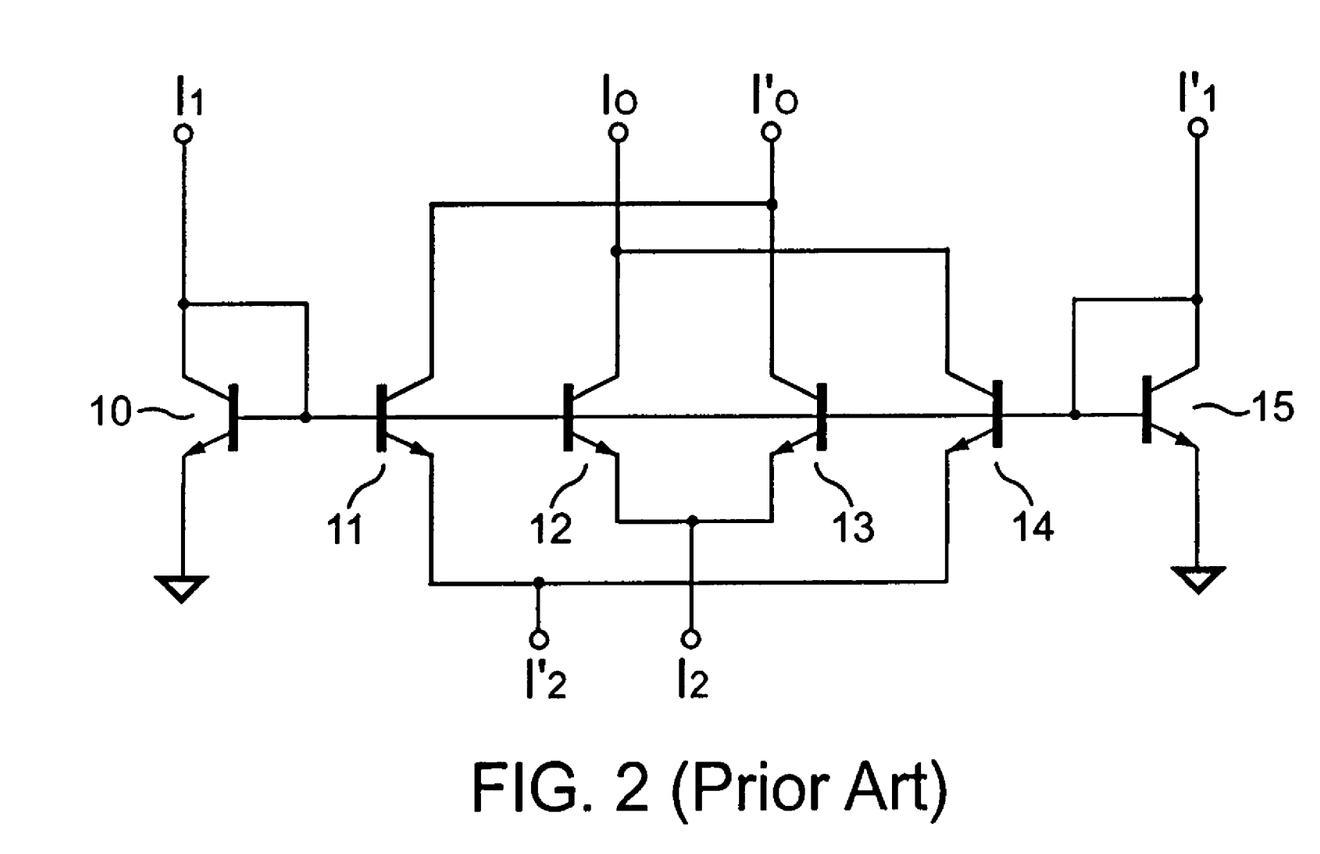
FIG. 2 shows a block diagram of a prior-art multiplier-divider.

The prior-art analog multiplier-divider shown in FIG. 2 supplies an output current with an amplitude that is proportional to the product of a first input current and a current ratio. The current ratio is equal to the amplitude of a second input current divided by the amplitude of a bias current. The prior-art multiplier-divider shown in FIG. 2 is built using bipolar transistor devices.

Many other known prior-art multiplier-dividers exist that are based on the principles of the prior-art multiplier-divider shown in FIG. 2. They all share the same disadvantages, to the extent that they are built using bipolar transistor devices.

One disadvantage of the prior-art multiplier-divider shown in FIG. 2 is that it is a bipolar device. For many present-day applications, such as PFC circuits, integrated circuits manufactured using a bipolar process are not suitable, because their die-size are too large and the cost is too high.

Another disadvantage of the prior-art multiplier-divider shown in FIG. 2 is that the output of the circuit varies significantly with temperature. The characteristic equations of bipolar transistors have high temperature coefficients. Thus, the output of the circuit is highly susceptible to temperature changes.

Another disadvantage of the prior-art multiplier-divider shown in FIG. 2 is high power consumption. The prior-art multiplier-divider requires a constant non-zero biasing current to bias bipolar transistors in linear mode. This results in significant power consumption.

Another disadvantage of the prior-art multiplier-divider shown in FIG. 2 is poor noise immunity. The prior-art multiplier-divider uses high-gain bipolar transistor devices. With such devices, even relatively small input signal distortion can result in significant output signal distortion.

Another disadvantage of the prior-art multiplier-divider shown in FIG. 2 is that it has a narrow input range, limited to the linear operating region of bipolar transistors. Outside of this narrow input range, the multiplier-divider shown in FIG. 2 is highly susceptible to distortion.

Therefore, there is a need for an improved analog multiplier-divider. In particular, there is a need for an improved analog multiplier-divider that has a smaller die size while being suitable for a wider range of operating temperatures.

SUMMARY OF THE INVENTION

The multiplier-divider according to the present invention produces an output signal in response to a first multiplier signal, a second multiplier signal and a divisor signal. The output signal is proportional to a product of the first multiplier signal and the second multiplier signal divided by a square of the divisor signal.

The multiplier-divider according to the present invention itself consists of two multiplier-divider stages cascaded together. A pulse generator is used to regulate the operation of the cascaded multiplier-divider stages. Each multiplier-divider stage consists of a charge-time control circuit, a linear charging block, and a sample-and-hold circuit.

The charge-time control circuit of each multiplier-divider stage produces a charge-time for the linear charging block. To perform division, the charge-time is modulated by a sawtooth signal, with a peak value proportional to the divisor signal. The length of the charge-time and a magnitude of a charge current are respectively determined in response to the first multiplier signal and the second multiplier signal of the multiplier-divider. The linear charging block of each multiplier-divider stage will be charged so that when sampled, it will output a voltage signal proportional to an appropriate ratio of the input signals.

Briefly, the multiplier-divider according to the present invention is built according to the principles of capacitor charge theory. The voltage across the capacitor is proportional to the product of the charge current and the charge time interval, and is divided by the capacitance of the capacitor. By using a modulated charge current and a programmable charge time to switch the capacitor, the voltage across the capacitor can be controlled. This capacitor voltage is also the output voltage of the multiplier-divider.

A general objective of the present invention is to provide an analog multiplier-divider for a power factor correction circuit of a switch-mode power supply. The multiplier-divider according to the present invention is intended for low speed applications that generally operate at internal clock rates of less than 100 kHz.

Another objective of the present invention is to provide an analog multiplier-divider that is manufactured using CMOS fabrication. The multiplier-divider according to the present invention exclusively uses MOSFET-based devices. Therefore, the multiplier-divider according to the present invention can be manufactured at a significantly smaller die-size, and at a lower cost, than the prior-art multiplier-dividers.

Another objective of the present invention is to provide an analog multiplier-divider having a characteristic equation that is substantially temperature-independent, compared to the prior-art multiplier-divider. The multiplier-divider according to the present invention is constructed with MOSFET-devices. Thus, the temperature coefficient of the multiplier-divider according to the present invention is low. The multiplier-divider according to the present invention can operate successfully over a very wide temperature range.

Another objective of the present invention is to provide an analog multiplier-divider with reduced power consumption. The multiplier-divider according to the present invention does not require a constant biasing current.

Another objective of the present invention is to provide an analog multiplier-divider with improved noise immunity. The accuracy of the output signal of the multiplier-divider according to the present invention is not significantly affected by small noise components from the input signals.

Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Referring now to the drawings wherein the contents are for purposes of illustrating the preferred embodiment of the invention only and not for purposes of limiting same, FIG. 2 shows a prior-art multiplier-divider.

The prior-art multiplier-divider is constructed with an array of six bipolar transistors. The multiplier-divider includes six transistors 10, 11, 12, 13, 14 and 15. A base of each of the transistors 10, 11, 12, 13, 14 and 15 are tied together.

A collector of the transistor 10 is connected to the base of the transistor 10. An emitter of the transistor 10 is connected to a ground reference. The collector of the transistor 10 is connected to a first positive input terminal $I_1$. A collector of the transistor 11 is connected to a negative output terminal $I'_O$. A collector of the transistor 12 is connected to a positive output terminal $I_O$. A collector of the transistor 13 is connected to the negative output terminal $I'_O$. An emitter of the transistor 12 and an emitter of the transistor 13 are connected to a second positive input terminal $I_2$. A collector of the transistor 14 is connected to the positive output terminal $I_O$. An emitter of the transistor 11 and an emitter of the transistor 14 are connected to a second negative input terminal $I'_2$. A collector of the transistor 15 is connected to a first negative input terminal $I'_1$. The collector of the transistor 15 is connected to the base of the transistor 15. An emitter of the transistor 15 is connected to the ground reference. Operation of this circuit will be well known to those skilled in the art and therefore detailed description thereof is omitted herein.

As discussed above, one major drawback of this prior-art multiplier-divider is that it is constructed using bipolar devices. This results in a large die-size, and introduces a high degree of temperature dependence into the characteristic of the multiplier-divider. For these reasons, the prior-art multiplier-divider shown in FIG. 2 is not suitable for use in a power converter with power factor correction (PFC). FIG. 1 shows a power converter. The power converter having power factor correction comprises an AC-power source 50, a rectifier 51, an inductor 52, a diode 53, two capacitors 54 and 61, a switch 55, four resistors 56, 57, 58 and 60, two comparators 59 and 62, a gate-driver 63 and a PFC circuit. The PFC circuit of FIG. 1 includes six resistors 64, 65, 67, 101, 102 and 103, a comparator 66, two capacitors 68 and 104, and a V-to-I converter 69. The PFC circuit further includes a multiplier-divider 100.

The power converter shown in FIG. 1 is a standard power supply known in the art. An input of the power supply is the AC-power source 50. The AC-power source 50 is coupled to a first input and to a second input of the rectifier 51. A first output of the rectifier 51 is connected to a first terminal of the inductor 52. A second terminal of the inductor 52 is connected to an anode of a diode 53. A cathode of the diode 53 is connected to an output voltage terminal $V_{OUT}$. The capacitor 54 is connected between the output voltage terminal $V_{OUT}$ and the ground reference. The switch 55 is connected between the second terminal of the inductor 52 and the ground reference.

To provide a feedback signal to the PFC circuit, the output voltage terminal $V_{OUT}$ is also connected to the ground reference via a resistor-divider network. The resistor-divider network consists of two resistors 64 and 65 connected in series. A junction of the resistor 64 and the resistor 65 is connected to a negative input of the comparator 66. A positive input of the comparator 66 is supplied with a reference voltage $V_R$. The negative input of the comparator 66 is connected to an output of the comparator 66 via a resistor 67 and a capacitor 68.

The output of the comparator 66 supplies a first multiplier signal $V_E$ to a first multiplier-input terminal VE of the multiplier-divider 100. A divisor-input terminal VAC of the multiplier-divider 100 is supplied with a divisor signal $V_{AC}$. The divisor-input terminal VAC of the multiplier-divider 100 is also connected to the ground reference via the resistor 103. The capacitor 104 is connected in parallel with the resistor 103. An input voltage $V_{IN}$ is supplied to the divisor-input terminal VAC via the resistor 102. A second multiplier-input terminal IAC of the multiplier-divider 100 is supplied with the input voltage $V_{IN}$ via the resistor 101. The resistor 101 transfers the input voltage $V_{IN}$ into a second multiplier signal $I_{AC}$. An output terminal OUT of the multiplier-divider 100 supplies an output signal $V_O$ to an input of the V-to-I converter 69.

An output of the V-to-I converter 69 generates a voltage $V_M$. The voltage $V_M$ is supplied to a second output of the rectifier 51 via the resistor 57. A positive input of the comparator 59 is also supplied with the voltage $V_M$. A negative input of the comparator 59 is connected to the ground reference via the resistor 58. The negative input of the comparator 59 is also connected to an output of the comparator 59, via the resistor 60 and the capacitor 61. The resistor 56 is connected between the second output of the rectifier 51 and the ground reference. The output of the comparator 59 is connected to a positive input of the comparator 62. A negative input of the comparator 62 is supplied with a sawtooth-signal $V_{SAW}$. An output of the comparator 62 drives the switch 55 via the gate-driver 63. The operation of this circuit will be well known to those skilled in the art and therefore detailed description thereof will be omitted herein.

Figure 3:
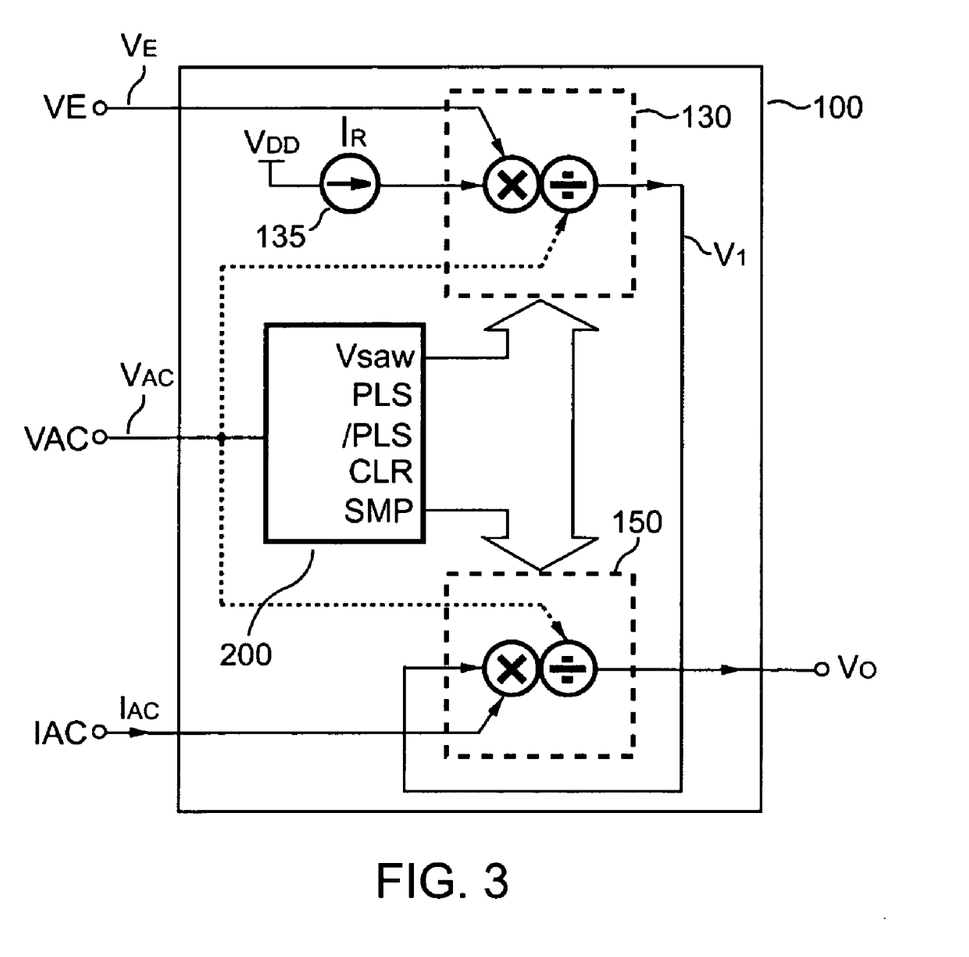
FIG. 3 shows a block diagram of a multiplier-divider according to the present invention.

To overcome the problems of the prior-art multiplier-divider, the present invention proposes an analog multiplier-divider constructed with MOSFET devices. FIG. 3 shows a block diagram of the multiplier-divider 100 according to the present invention. The multiplier-divider 100 has a first multiplier-input terminal VE for receiving a first multiplier signal $V_E$, a second multiplier-input terminal IAC for receiving a second multiplier signal $I_{AC}$, and a divisor-input terminal VAC for receiving a divisor signal $V_{AC}$. The multiplier-divider 100 also has an output terminal OUT, which provides an output signal $V_O$. The magnitude of the output signal $V_O$ is proportional to the magnitude of the first multiplier signal $V_E$ multiplied by the magnitude of the second multiplier signal $I_{AC}$, divided by the square of the magnitude of the divisor signal $V_{AC}$. The output signal $V_O$ of the multiplier-divider 100 can be expressed as, $$V_O \propto I_R \times \left(\frac{I_{AC} \times V_E}{V_{AC}^2}\right) \quad (2)$$

where the current $I_R$ is constant.

According to the present invention, the second multiplier signal $I_{AC}$ and the constant current $I_R$ are current signals while the first multiplier signal $V_E$, the divisor signal $V_{AC}$ and the output signal $V_O$ are voltage signals.

The multiplier-divider 100 consists of a first multiplier-divider stage 130, a second multiplier-divider stage 150, and a pulse generator 200. The first multiplier-divider stage 130 and the second multiplier-divider stage 150 are both multiplier-dividers. Each multiplier-divider has three inputs and an output. In the multiplier-divider 100, the first multiplier-divider stage 130 and the second multiplier-divider stage 150 are cascaded to obtain the desired output signal $V_O$.

The pulse generator 200 generates signals including a pulse-signal PLS, an inverse pulse signal /PLS, a clear signal CLR, a sawtooth signal $V_{SAW}$, and a sample signal SMP. Above signals are respectively supplied to the first multiplier-divider stage 130 and the second multiplier-divider stage 150 to control the operation of the multiplier-divider 100.

The first multiplier-divider stage 130 has a first input connected to the first multiplier-input terminal VE of the multiplier-divider 100. The first multiplier-divider stage 130 further has a second input driven by a constant current source 135, which provides a constant current $I_R$. The first multiplier-divider stage 130 further has a third input coupled to the divisor signal.

The second multiplier-divider stage 150 has a first input supplied with an output signal $V_1$ of the first multiplier-divider stage 130. The second multiplier-divider stage 150 further has a second input connected to the second multiplier-input terminal IAC of the multiplier-divider 100. The second multiplier-divider stage 150 further has a third input coupled to the divisor signal.

Figure 4:
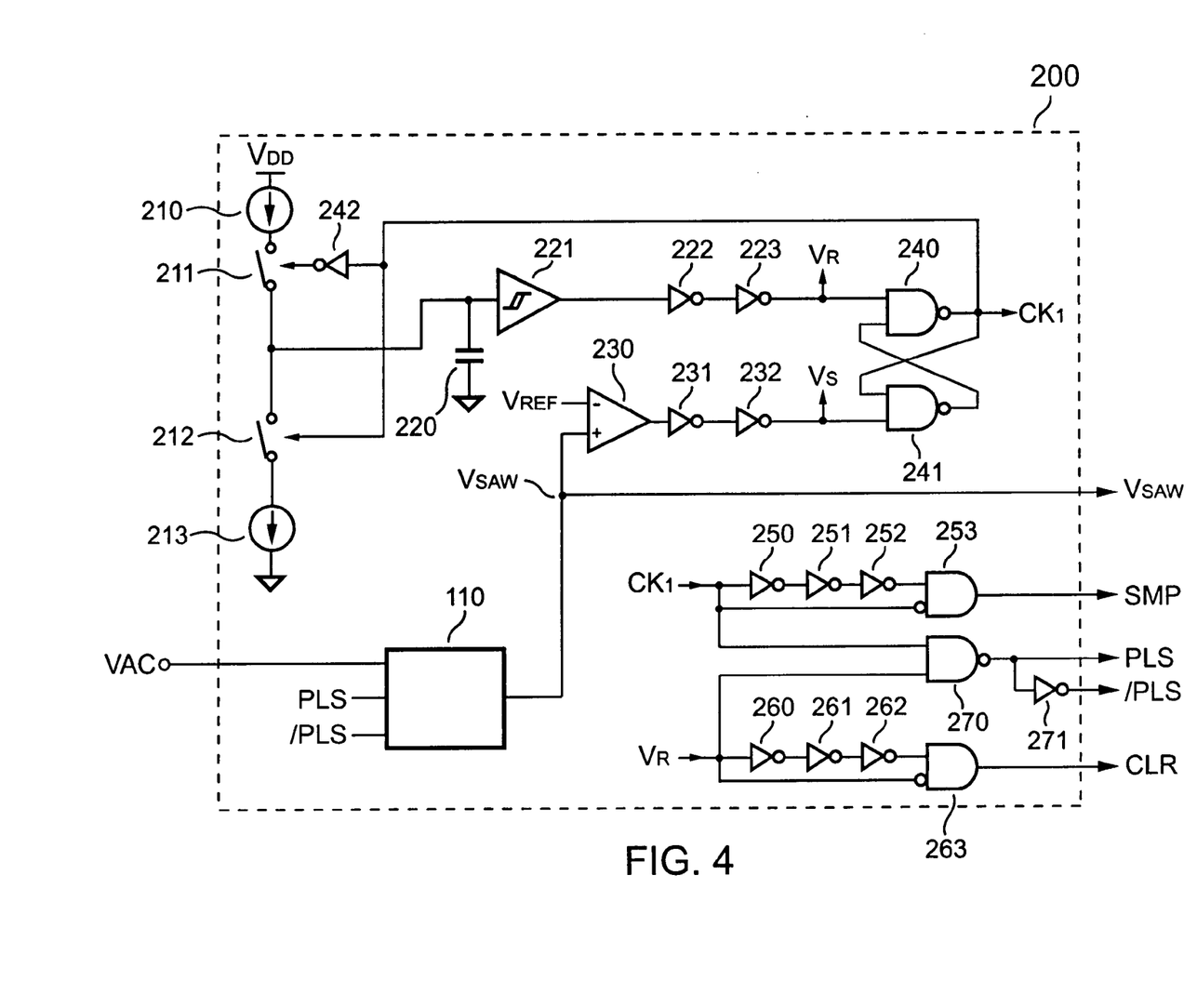
FIG. 4 shows a pulse generator of the multiplier-divider according to the present invention.

FIG. 4 shows the pulse generator 200. The pulse generator 200 includes a sawtooth-signal generator 110, a current source 210, a switch 211, a switch 212, and a current sink 213. The pulse generator 200 further includes a capacitor 220, a hysteresis comparator 221 and two NOT-gates 222 and 223. The pulse generator 200 further includes a comparator 230, three NOT-gates 231 232 and 242, and two NAND-gates 240 and 241. The pulse generator 200 further includes three NOT-gates 250, 251 and 252, and an AND-gate 253. The pulse generator 200 further includes four NOT-gates 260, 261, 262 and 271, an AND-gate 263 and a NAND-gate 270.

An input of the current source 210 is connected to a voltage source $V_{DD}$. The switch 211 is connected between an output of the current source 210 and an input junction. The switch 212 is connected between the input junction and an input of the current sink 213. An output of the current sink 213 is connected to the ground reference. An input of the hysteresis comparator 221 is connected to the input junction. The capacitor 220 is connected between the input of the hysteresis comparator 221 and the ground reference. An output of the hysteresis comparator 221 is connected to an input of the NOT-gate 222. An output of the NOT-gate 222 is connected to an input of the NOT-gate 223. An output of the NOT-gate 223 provides a signal $V_R$.

A positive input of the comparator 230 is connected to an output terminal of the sawtooth-signal generator 110. A negative input of the comparator 230 is supplied with a reference voltage $V_{REF}$. An output of the comparator 230 is connected to an input of the NOT-gate 231. An output of the NOT-gate 231 is connected to an input of the NOT-gate 232. An output of the NOT-gate 232 provides a signal $V_S$.

A first input of the NAND-gate 240 is driven by the signal $V_R$. A second input of the NAND-gate 240 is connected to an output of the NOT-gate 241. A first input of the NAND-gate 241 is connected to an output of the NAND-gate 240. A second input of the NAND-gate 241 is driven by the signal $V_S$. The output of the NAND-gate 240 supplies a signal $CK_1$ to drive a control terminal of the switch 211 via the NOT-gate 242. Further, a control terminal of the switch 212 is also supplied with the signal $CK_1$.

An input of the NOT-gate 250 is driven by the signal $CK_1$. An input of the NOT-gate 251 is connected to an output of the NOT-gate 250. An input of the NOT-gate 252 is connected to an output of the NOT-gate 251. An output of the NOT-gate 252 is connected to an input of the AND-gate 253. An inverted input of the AND-gate 253 is supplied with the signal $CK_1$. An output of the AND-gate 253 supplies the sample signal SMP of the pulse generator 200. An input of the NOT-gate 260 is supplied with the signal $V_R$. An input of the NOT-gate 261 is connected to an output of the NOT-gate 260. An input of the NOT-gate 262 is connected to an output of the NOT-gate 261. An output of the NOT-gate 262 is connected to an input of the AND-gate 263. An inverted input of the AND-gate 263 is supplied with the signal $V_R$. An output of the AND-gate 263 supplies the clear-signal CLR.

A first input of the NAND-gate 270 is supplied with the signal $CK_1$. A second input of the NAND-gate 270 is supplied with the signal $V_R$. An output of the NAND-gate 270 supplies the pulse signal PLS and supplies the inverse pulse signal /PLS via the NOT-gate 271. The operation of the pulse generator 200 will be well known to those skilled in the art and therefore is discussed detail herein.

Figure 5:
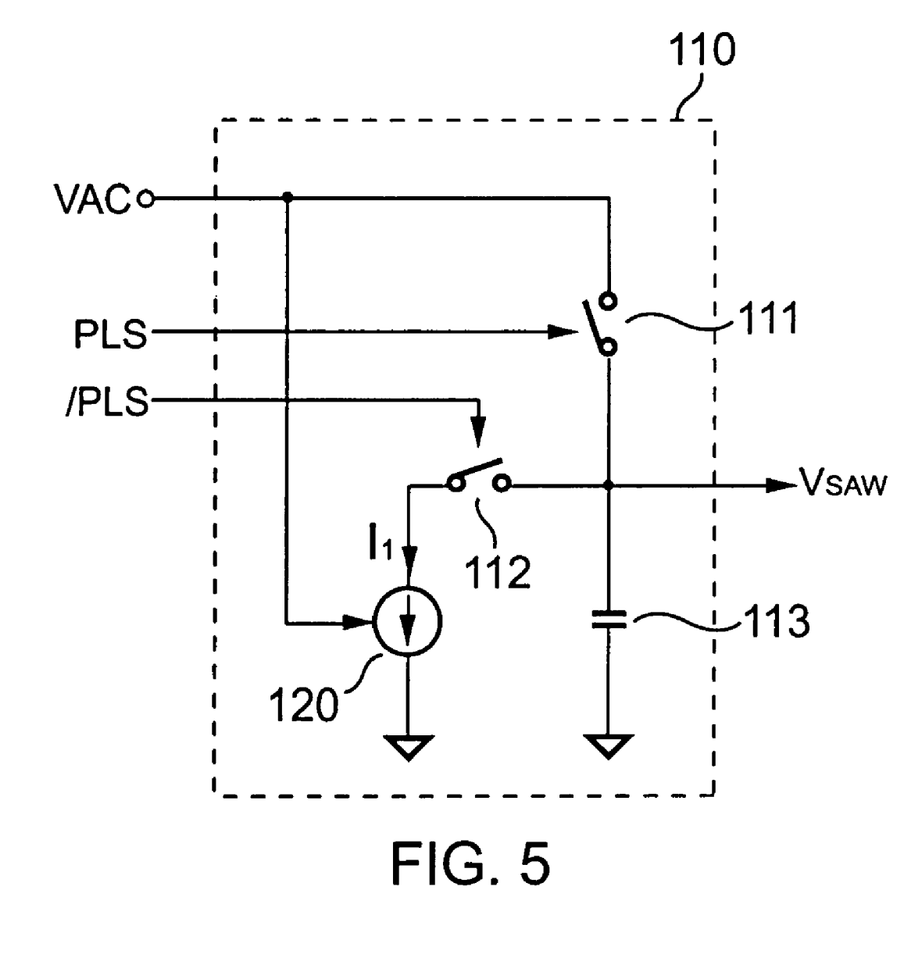
FIG. 5 shows a detailed block diagram of a sawtooth-signal generator of the pulse generator according to the present invention.

FIG. 5 shows the sawtooth-signal generator 110 according to a preferred embodiment of the present invention. The sawtooth-signal generator 110 comprises a switch 111, a switch 112, a capacitor 113, and a variable current sink 120. A control terminal of the switch 111 is supplied with the pulse-signal PLS. A control terminal of the switch 112 is supplied with the inverse pulse signal /PLS. An input terminal of the switch 111 is connected to the divisor-input terminal VAC. An output terminal of the switch 111 is connected to an input terminal of the switch 112. The capacitor 113, generates the sawtooth signal $V_{SAW}$, is connected between the output terminal of the switch 111 and the ground reference. An output terminal of the switch 112 is connected to the ground reference via the variable current sink 120. A control terminal of the variable current sink 120 is connected to the divisor-input terminal VAC.

When the pulse generator 200 supplies a logic-high pulse signal PLS, the switch 111 will close. This will cause the capacitor 113 to be promptly charged to a voltage level of the divisor signal $V_{AC}$. When the pulse signal PLS goes low, the switch 112 will close, and the switch 111 will open. At this point, the capacitor 113 will begin to discharge. The variable current sink 120 will discharge the capacitor 113. To ensure that the discharge time will be independent of the divisor signal $V_{AC}$, the dynamic current sink 120 generates a sink current $I_1$ that is proportional to the magnitude of the divisor signal $V_{AC}$.

Figure 6:
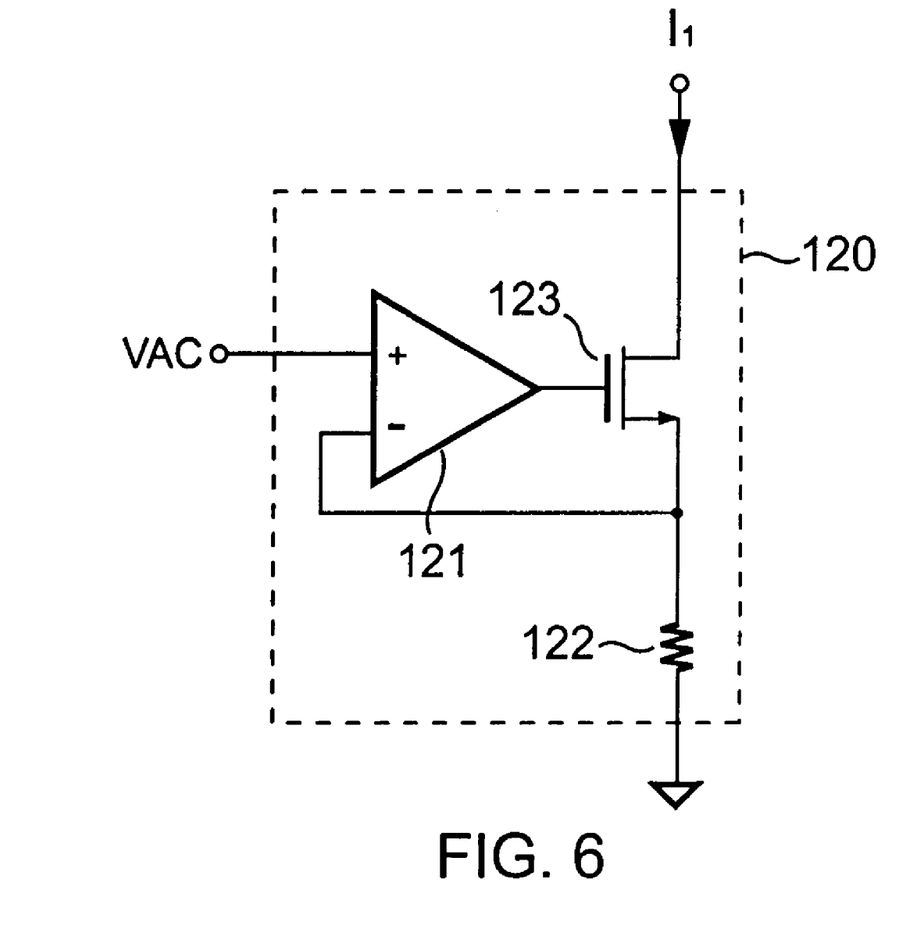
FIG. 6 shows a detailed block diagram of a variable current sink of the sawtooth-signal generator according to the present invention.

FIG. 6 shows the variable current sink 120 according to a preferred embodiment of the present invention. The variable current sink 120 generates the sink current $I_1$ that is proportional to the magnitude of the divisor signal $V_{AC}$. This property is used to regulate the discharge time of the capacitor 113, so that the length of the sawtooth period will be independent of the magnitude of the divisor signal of the multiplier-divider 100.

The variable current sink 120 comprises an operation amplifier 121, a resistor 122, and a MOSFET 123. A positive terminal of the operation amplifier 121 is connected to the control terminal of the variable current sink 120. A negative terminal of the amplifier 121 is connected to a source of the MOSFET 123. The source of the MOSFET 123 is connected to an output terminal of the variable current sink 120 via the resistor 122. An output terminal of the operation amplifier 121 is connected to a gate of the MOSFET 123. A drain of the MOSFET 123 is connected to an input terminal of the variable current sink 120. The variable current sink 120 will sink the sink current $I_1$ that is proportional to the magnitude of the divisor-input signal $V_{AC}$, divided by the resistance of the resistor 122. Operation of this circuit will be well known to those skilled in the art and therefore a detailed description thereof is omitted herein.

Figure 7:
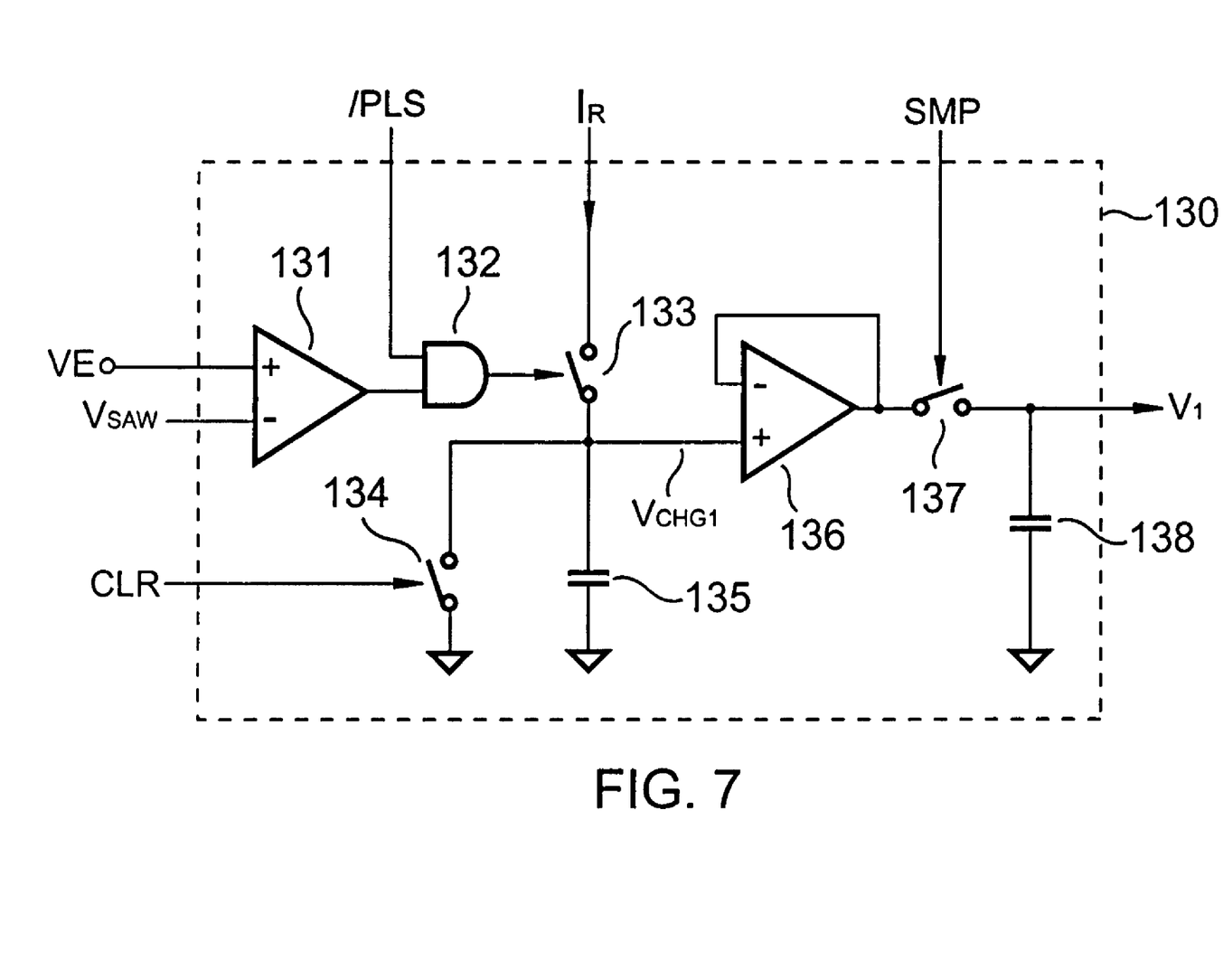
FIG. 7 shows a detailed block diagram of a first multiplier-divider stage of the multiplier-divider according to the present invention.

FIG. 7 shows the first multiplier-divider stage 130 of the multiplier-divider 100 according to a preferred embodiment of the present invention. The first multiplier-divider stage 130 comprises of a charge-time control circuit, a linear charging block, and a sample-and-hold circuit.

The charge-time control circuit of the first multiplier-divider stage 130 includes a comparator 131 and an AND-gate 132. A negative input of the comparator 131 is supplied with the sawtooth signal $V_{SAW}$. A positive input of the comparator 131 is connected to the first multiplier-input terminal VE. An output of the comparator 131 is connected to a first input of the AND-gate 132. A second input of the AND-gate 132 is supplied with the inverse pulse signal /PLS. An output of the AND-gate 132 generates a charge-time control signal. The charge-time control signal determines the length of an on-time $t_{CHG}$ of the switch 133.

When the pulse signal PLS supplied by the pulse generator 200 goes low, the AND-gate 132 will output the charge-time control signal in response to the magnitude of the first multiplier signal $V_E$.

The charge-time control signal is supplied to the linear charging block. The linear charging block includes a capacitor 135 and two switches 133 and 134. An input terminal of the switch 133 is supplied with the constant current $I_R$. An output of the switch 133 is connected to an input terminal of the switch 134. A control terminal of the switch 133 is connected to an output of the AND-gate 132. An output terminal of the switch 134 is connected to the ground reference. A control terminal of the switch 134 is supplied with the clear signal CLR. The capacitor 135 is connected in parallel with the switch 134. The on-time $t_{CHG}$ of the switch 133 will be proportional to the first multiplier signal $V_E$ and will be inversely proportional to the magnitude of the divisor signal $V_{AC}$.

When the switch 133 is closed by the charge-time control signal supplied by the AND-gate 132, the capacitor 135 will begin to be charged by the constant current $I_R$. When the pulse generator 200 generates a clear signal CLR, the switch 134 will close, and the charge stored in the capacitor 135 will be discharged.

The capacitor 135 generates a charge signal $V_{CHG1}$, which is supplied to the sample-and-hold circuit. The sample-and-hold circuit includes an OPA 136, a switch 137, and a capacitor 138. A positive input of the OPA 136 is connected to the output terminal of the switch 133. A negative input of the OPA 136 is connected to an output terminal of the OPA 136. An input terminal of the switch 137 is connected to the output terminal of the OPA 136. A control terminal of the switch 137 is supplied with the sample signal SMP of the pulse generator 200. The capacitor 138, which is connected between an output terminal of the switch 137 and the ground reference, generates an output signal $V_1$.

The OPA 136 is a buffer for the charge of the capacitor 135. When a logic-high sample signal SMP from the pulse generator 200 closes the switch 137, the voltage at the output terminal of the OPA 136 will be equal to the potential of the capacitor 135. The maximum voltage of the capacitor 135 will determine the output signal $V_1$ of the first multiplier-divider stage 130. The magnitude of the output signal $V_1$ will be proportional to the magnitude of the first multiplier signal $V_E$ multiplied by the magnitude of the constant current $I_R$, divided by the magnitude of the divisor signal $V_{AC}$. The capacitor 138 is included as a holding capacitor.

Figure 8:
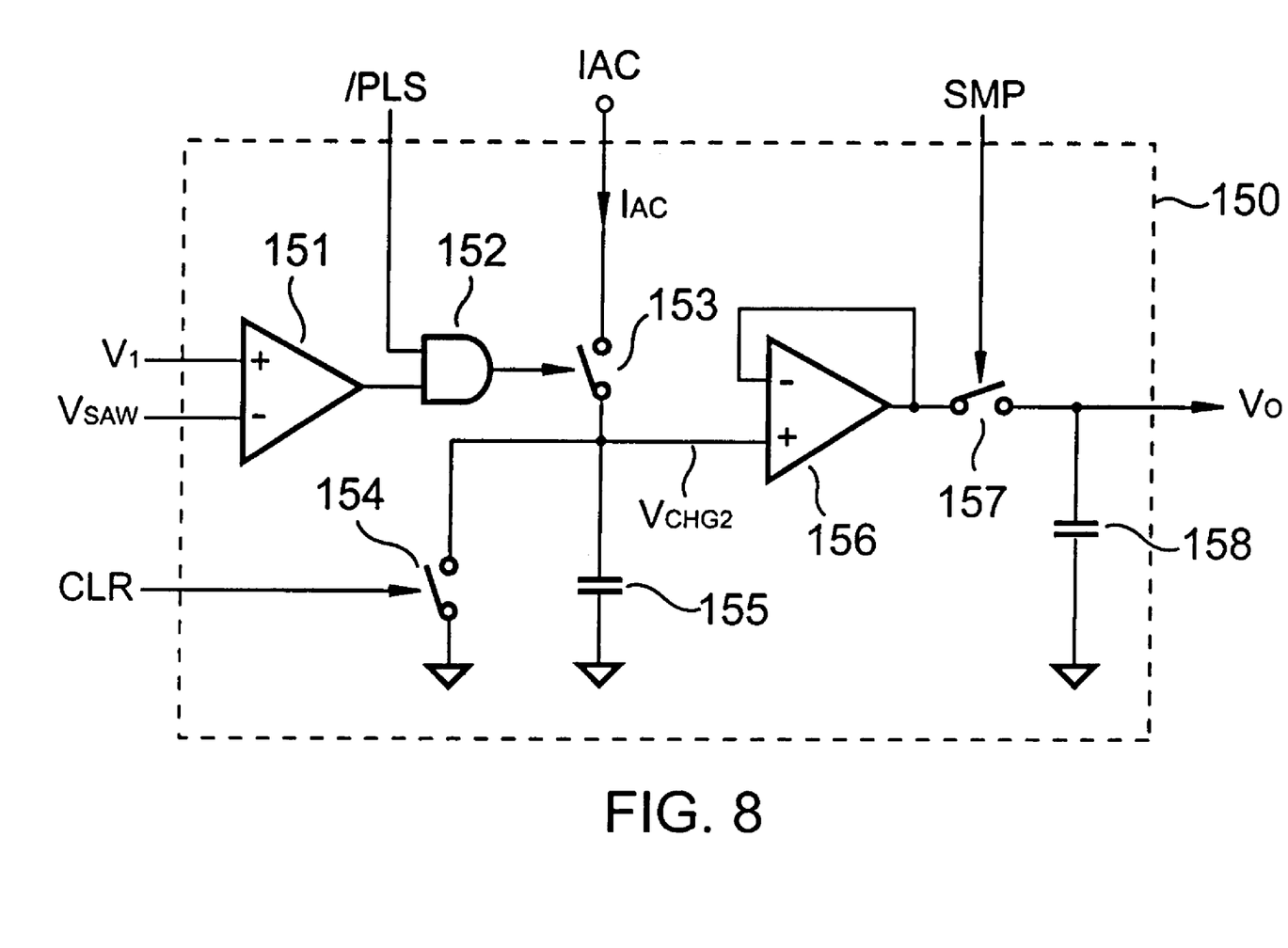
FIG. 8 shows a detailed block diagram of a second multiplier-divider stage of the multiplier-divider according to the present invention.

The output signal $V_1$ of the first multiplier-divider stage 130 of the multiplier-divider 100 is coupled to the second multiplier-divider stage 150 of the multiplier-divider 100. The second multiplier-divider stage 150 of the multiplier-divider 100 also has a charge-time control circuit, a linear charging block, and a sample-and-hold circuit with the same components as the first multiplier-divider stage 130.

The first multiplier-divider stage 130 of the switched-charge multiplier-divider 100 is implemented according to the principles of capacitor charge theory. An important equation describing the behavior of capacitors is:

$$Q = C \times V = I \times T \tag{3}$$

where Q is the charge stored in the capacitor, C is the capacitance of the capacitor, V is the voltage across the capacitor, I is the charge current, and T is the charge time.

According to equation (3), the voltage across the capacitor $C_{135}$ can be expressed as:

$$V_{CHG1} = \frac{I_R \times t_{CHG}}{C_{135}} \quad (4)$$

where the constant current $I_R$ is used to charge the capacitor 135.

$t_{CHG}$ refers to the length of time that the charge current $I_R$ is applied to the capacitor 135. This can be expressed as:

$$t_{CHG} = \frac{\Delta t \times V_E}{V_{AC}} \quad (5)$$

Here, $V_E$ is the first multiplier signal of the first multiplier-divider stage 130 of the multiplier-divider 100. $V_{AC}$ is input into the sawtooth-signal generator 110. $\Delta t$ is the off-period of the pulse-signal PLS generated by the pulse generator 200. The off-period $\Delta t$ of the pulse signal PLS is constant for the purposes of this operation (see FIG. 9). Thus, equation (4) can be rewritten as:

$$V_{CHG1} = \frac{I_R}{C_{135}} \times \frac{V_E}{V_{AC}} \times \Delta t \quad (6)$$

Since $I_R$, $C_{135}$, and $\Delta t$ are constants, equation (6) can be simplified to:

$$V_{CHG1} \propto \frac{V_E}{V_{AC}} \quad (7)$$

After the charging of the capacitor 135 is completed, the sample-and-hold circuit of the first multiplier-divider stage 130 will buffer the charge signal $V_{CHG1}$. The magnitude of the output signal $V_1$ of the first multiplier-divider stage 130 will be equal to $V_{CHG1}$.

Thus, the basic principles of the first multiplier-divider stage 130 of the multiplier-divider 100 according to the present invention are described above. The second multiplier-divider stage 150 of the multiplier-divider 100 is built according to the same principles as the first multiplier-divider stage 130.

Thus, according the equation (6), the output $V_O$ of the second multiplier-divider stage 150 can be expressed as:

$$V_O = \frac{I_{AC}}{C_{155}} \times \frac{V_1}{V_{AC}} \times \Delta t \quad (8)$$

$C_{155}$ and $\Delta t$ are constants. Combining equation (7) and (8), the output signal $V_O$ of the multiplier-divider 100 can be expressed as:

$$V_O \propto \frac{I_{AC} \times V_E}{V_{AC}^2} \quad (9)$$

FIG. 8 shows the second multiplier-divider stage 150 according to a preferred embodiment of the present invention. The second multiplier-divider stage 150 includes a comparator 151, an AND-gate 152, three switches 153, 154 and 157, two capacitors 155 and 158, and an op amplifier (OPA) 156. A positive input of the comparator 151 is supplied with the output signal $V_1$ of the first multiplier-divider stage 130. A negative input of the comparator 151 is supplied with the sawtooth signal $V_{SAW}$. A first input of the AND-gate 152 is connected to an output of the comparator 151. A second input of the AND-gate 152 is supplied with the inverse pulse signal /PLS of the pulse generator 200. A control terminal of the switch 153 is driven by an output of the AND-gate 152. An input terminal of the switch 153 is connected to the second multiplier-input terminal IAC. An output terminal of the switch 153 is connected to an input terminal of the switch 154. An output terminal of the switch 154 is connected to the ground reference. The capacitor 155 is connected in parallel with the switch 154. A positive input of the OPA 156 is connected to the output terminal of the switch 153. A negative input of the OPA 156 is connected to an output of the OPA 156. The switch 157 is connected between an output terminal of the OPA 156 and the output terminal OUT of the multiplier-divider 100. The capacitor 158 is connected between the output terminal OUT of the multiplier-divider 100 and the ground reference.

Figure 9:
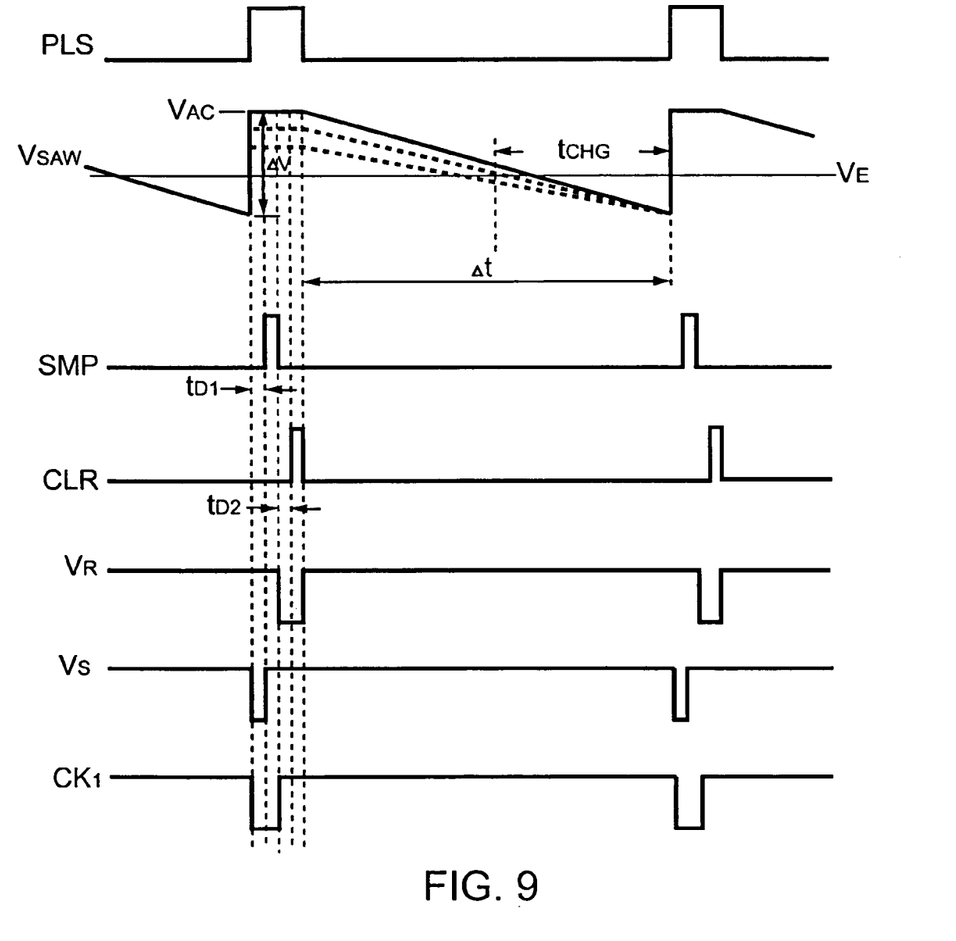
FIG. 9 shows a timing diagram of the pulse generator according to the present invention.

FIG. 9 is a timing diagram illustrating the operation of the pulse generator 200. The pulse generator 200 supplies the pulse signal PLS, and the inverse pulse signal /PLS, the sample signal SMP, and the clear signal CLR. The sample signal SMP follows the pulse signal PLS after a delay time $t_{D1}$. The clear signal CLR follows the sample-signal SMP after a delay time $t_{D2}$.

When the pulse generator 200 generates the pulse signal PLS, the sawtooth-signal generator 110 will create the sawtooth signal $V_{SAW}$ in response to the divisor signal VAC. After the pulse signal PLS goes low, the charge-time control circuit will compare the sawtooth signal $V_{SAW}$ with the first multiplier signal $V_E$ to produce the on-time of the switch 133. The length of the on-time $t_{CHG}$ will be proportional to the magnitude of the first multiplier-signal $V_E$ divided by the magnitude of the divisor-signal $V_{AC}$. The linear charging block will charge the capacitor 135 for the duration of the on-time $t_{CHG}$. The constant current $I_R$ will charge the capacitor 135. At this point, the charge of the capacitor 135 will determine the magnitude of the output signal $V_1$ of the first multiplier-divider stage 130 of the multiplier-divider 100. When the pulse generator 200 supplies a logic-high sample signal SMP, the sample-and-hold circuit will hold the output signal $V_O$ of the multiplier-divider 100 across the capacitor 158. The pulse generator 200 will generate the clear-signal CLR following the sample signal SMP, to reset the multiplier-divider 100.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

The invention claimed is:

1. A multiplier-divider circuit for a PFC controller, comprising:
   a first multiplier-input terminal, for accepting a first multiplier signal;
   a second multiplier-input terminal, for accepting a second multiplier signal;
   a divisor-input terminal, for accepting a divisor-signal;
   a constant current source, for providing a constant current;

a pulse generator, for generating a pulse-signal, an inversed pulse-signal, a sawtooth-signal, a sample-signal and a clear-signal;

a first multiplier-divider stage, having a first input, a second input, a third input and an output, wherein said first input of said first multiplier-divider stage is connected to said first multiplier-input terminal, said second input of said first multiplier-divider stage is connected to said constant current source, and said third input of said first multiplier-divider stage is coupled to said divisor signal;

a second multiplier-divider stage, having a first input, a second input, a third input and an output, wherein said first input of said second multiplier-divider stage is connected to said output of said first multiplier-divider stage, said second input of said second multiplier-divider stage is connected to said second multiplier-input terminal, and said third input of said second multiplier-divider stage is coupled to said divisor signal; and an output terminal, connected to said output of said second multiplier-divider stage.

2. The multiplier-divider circuit according to claim 1, wherein a magnitude of an output signal of said first multiplier-divider stage is substantially proportional to a product of a magnitude of said first multiplier-signal and a magnitude of said constant current.

3. The multiplier-divider circuit according to claim 1, wherein said magnitude of said output signal of said first multiplier-divider stage is inversely proportional to a magnitude of said divisor-signal.

4. The multiplier-divider circuit according to claim 1, wherein a magnitude of an output signal of said second multiplier-divider stage is substantially proportional to a product of said magnitude of said first multiplier-signal, a magnitude of said second multiplier signal, and said magnitude of said constant current.

5. The multiplier-divider circuit according to claim 1, wherein a magnitude of said output signal of said second multiplier-divider stage is inversely proportional to a square of said magnitude of said divisor-signal.

6. The multiplier-divider circuit according to claim 1, wherein said pulse generator comprises:

a pulse-signal output terminal;

a sawtooth-signal generator;

an inversed pulse-signal output terminal;

a sample-signal output terminal;

a clear-signal output terminal;

a pulse-generator current source, having an input connected to a voltage source;

a pulse-generator current sink, having an output connected to a ground reference;

a pulse generator junction;

a first pulse generator switch, connected between an output of the pulse generator current source and said pulse generator junction;

a second pulse generator switch, connected between said pulse generator junction and an input of said pulse generator current sink; and a control circuit, for controlling said first pulse generator switch and said second pulse generator switch.

7. The multiplier-divider circuit according to claim 6, wherein said control circuit comprises:

a hysteresis comparator, having an input connected to said pulse generator junction;

a pulse-generator capacitor, connected between said input of said hysteresis comparator and said ground reference;

a first array of two NOT-gates, having an input connected to an output of said hysteresis comparator;

a pulse-generator comparator, having a positive input connected to an output of the sawtooth-signal generator, said pulse generator comparator having a negative input supplied with a reference voltage;

a second array of two NOT-gates, having an input connected to an output of said pulse-generator comparator;

a latch circuit, consisting of a first NAND-gate and a second NAND-gate, said latch circuit having a first input connected to an output of said first array of two NOT-gates, said latch circuit having a second input connected to an output of said second array of two NOT-gates, said latch circuit having an output for supplying a control signal to said second pulse-generator switch; and a first pulse-generator NOT-gate, for supplying another control signal to said first pulse-generator switch, said first pulse-generator NOT-gate having an input connected to said output of said latch circuit.

8. The multiplier-divider circuit according to claim 7, wherein the control circuit further comprises:

a first array of three NOT-gates, having an input connected to said output of the latch circuit;

a first pulse-generator AND-gate, having an input, an inverted input, an output, wherein said input of said first pulse-generator AND-gate is connected to an output of said first array of three NOT-gates, said inverted input of said first pulse-generator AND-gate is connected to said output of said latch circuit, and said output of said first pulse-generator AND-gate is connected to said sample-signal output terminal;

a second array of three NOT-gates, having an input connected to said first input of said latch circuit;

a second pulse-generator AND-gate, having an input, an inverted input and an output, wherein said input of said second pulse-generator AND-gate is connected to an output of said second array of three NOT-gates, said inverted input of said second pulse-generator AND-gate is connected to said first input of said latch circuit, and said output of said second pulse-generator AND-gate is connected to said clear-signal output terminal of said pulse generator;

a third NAND-gate, having a first input, a second input and an output, wherein said first input of said third NAND-gate is connected to said output of said latch circuit, said second input of said third NAND-gate is connected to said first input of said latch circuit, and said output of said third NAND-gate is connected said pulse-signal output terminal; and a second pulse-generator NOT-gate, for supplying said inverse pulse-signal, said second pulse generator NOT-gate having an input connected to said output of said third NAND-gate.

9. The multiplier-divider circuit according to claim 6, wherein the sawtooth-signal generator comprises:

a sawtooth-signal output terminal, for outputting said sawtooth-signal;

a sawtooth capacitor, connected between said sawtooth-signal output terminal and said ground reference;

a sawtooth current sink, for discharging said sawtooth capacitor, said sawtooth current sink having an output connected to said ground reference;

a sawtooth discharge switch, connected between said sawtooth-signal output terminal and an input of said sawtooth current sink, said sawtooth discharge switch having a control terminal supplied with said inversed pulse-signal; and a sawtooth charging switch, connected between said divisor-input terminal and said sawtooth-signal output terminal, said sawtooth charging switch having a control terminal supplied with said pulse-signal.

10. The multiplier-divider circuit according to claim 9, wherein said sawtooth current sink comprises:

a sawtooth transistor, for producing a variable discharge current, said sawtooth transistor having a drain connected to said sawtooth-signal output terminal via said sawtooth discharge switch;

a sawtooth operation amplifier, for driving said sawtooth transistor, said sawtooth operation amplifier having a negative input connected to a source of said sawtooth transistor, and a positive input connected to said divisor-input terminal; and a sawtooth resistor, connected between said source of said sawtooth transistor and said ground reference.

11. The multiplier-divider circuit according to claim 9, wherein a length of a charge time and a length of a discharge time of said sawtooth capacitor are independent of said magnitude of said divisor input signal.

12. The multiplier-divider circuit according to claim 9, wherein a peak value of the sawtooth-signal is proportional to said the magnitude of said divisor-input signal.

13. The multiplier-divider circuit according to claim 1, wherein said first multiplier-divider stage comprises:

a first charge-time control circuit, for generating a first charge-time signal;

a first linear charging block, for generating a first charging signal; and a first sample-and-hold circuit, for producing an first output signal.

14. The multiplier-divider circuit according to claim 13, wherein said first charge-time control circuit of said first multiplier-divider stage comprises:

a first charge-time comparator, for supplying a first initial signal, said first charge-time comparator having a positive input connected to said first multiplier-input terminal, and a negative input supplied with said sawtooth-signal; and a first AND-gate, for generating said first charge-time signal, said first AND-gate having a first input supplied with said inverse pulse-signal, and a second input connected to an output of said first charge-time comparator.

15. The multiplier-divider circuit according to claim 13, wherein said first linear charging block of the first multiplier-divider stage comprises:

a first charge-output terminal, for supplying said first charging signal;

a first charge capacitor, for generating said first charging signal, said first charge capacitor being connected between said output terminal and said ground reference;

a first charge switch, for controlling a charge-time of said first charge capacitor, said first charge switch being connected between said constant current source and said first charge-output terminal, wherein said first charge switch comprises an control terminal controlled by said first charge-time control circuit; and a first discharge switch, for discharging said first charge capacitor, said discharge switch being connected between said first charge-output terminal and said ground reference, said discharge switch having a control terminal controlled by said clear-signal, wherein a state of said first multiplier-divider stage is reset in response to said clear-signal.

16. The multiplier-divider circuit according to claim 13, wherein said first sample-and-hold circuit of said first multiplier-divider stage comprises:

a first sample-and-hold operation amplifier, for buffering said first charging signal, said first sample-and-hold operation amplifier having a positive input supplied with said first charging signal, and a negative input connected to an output of first said sample-and-hold operation amplifier;

a first sample-and-hold switch, for sampling said first charging signal, said first sample-and-hold switch being connected between said output of said first sample-and-hold operation amplifier and said output of said first multiplier-divider stage; and a first sample-and-hold capacitor, for holding said output signal of said first multiplier-divider stage, said first sample-and-hold capacitor being connected between the output terminal of said first multiplier-divider stage and said ground reference.

17. The multiplier-divider circuit according to claim 1, wherein said second multiplier-divider stage comprises:

a second charge-time control circuit, for generating a second charge-time signal;

a second linear charging block, for generating a second charging signal; and a second sample-and-hold circuit, for producing an second output signal.

18. The multiplier-divider circuit according to claim 17, wherein said second charge-time control circuit of said second multiplier-divider stage comprises:

a second charge-time comparator, for supplying a second initial signal, said second charge-time comparator having a positive input connected to said output terminal of said first multiplier-divider stage, and a negative input supplied with said sawtooth-signal; and a second AND-gate, for generating said second charge-time signal, said second AND-gate having a second input supplied with said inverse pulse-signal, and a second input connected to an output of said charge-time comparator.

19. The multiplier-divider circuit according to claim 17, wherein said second linear charging block of said second multiplier-divider stage comprises:

a second charge-output terminal, for supplying said second charging signal;

a second charge capacitor, for generating said second charging signal, said second charge capacitor being connected between said output terminal and said ground reference;

a second charge switch, for controlling a charge-time of said charge capacitor, said charge switch being connected between said second multiplier-input terminal and said second charge-output terminal, said second charge switch having a control terminal controlled by said second charge-time control circuit; and a second discharge switch, for discharging said second charge capacitor, said discharge switch being connected between said second charge-output terminal and said ground reference, said discharge switch having a control terminal controlled by said clear-signal, wherein a state of said second multiplier-divider stage is reset in response to said clear-signal.

20. The multiplier-divider circuit according to claim 17, wherein said second sample-and-hold circuit of said second multiplier-divider stage comprises:
- a second sample-and-hold operation amplifier, for buffering said second charging signal, said second sample-and-hold operation amplifier having a positive input supplied with said second charging signal and a negative input connected to an output of second said sample-and-hold operation amplifier;
- a second sample-and-hold switch, for sampling said second charging signal, said second sample-and-hold switch being connected between said output of said second sample-and-hold operation amplifier and said output of said second multiplier-divider stage; and
- a second sample-and-hold capacitor, for holding said output signal of said multiplier-divider, said second sample-and-hold capacitor being connected between the output terminal of said second multiplier-divider stage and said ground reference.

21. The multiplier-divider circuit according to claim 1, wherein the length of said first charge-time of said first multiplier-divider stage is proportional to the magnitude of said first multiplier-signal divided by the magnitude of the divisor-signal.

22. The multiplier-divider circuit according to claim 1, wherein a length of said second charge-time of said second multiplier-divider stage is proportional to said magnitude of said second multiplier-signal divided by said magnitude of said divisor-signal.

23. The multiplier-divider circuit according to claim 1, wherein said sample-signal is generated in response to said pulse-signal, following a delay time, wherein said clear-signal is generated in response to said sample-signal following a delay time.

24. The multiplier-divider circuit according to claim 1, wherein said multiplier-divider circuit is built from CMOS MOSFET-based devices.

* * * * *